United States Patent [19]

Gilmour

[11] Patent Number: 5,392,257
[45] Date of Patent: Feb. 21, 1995

[54] SONAR RECEIVER WITH IMPROVED TIME VARIED GAIN CORRECTION

[75] Inventor: John E. Gilmour, Richland Township, Allegheny County, Pa.

[73] Assignee: Westinghouse Electric Corp., Pittsburgh, Pa.

[21] Appl. No.: 109,891

[22] Filed: Aug. 23, 1993

[51] Int. Cl.[6] .............................................. G01S 15/00
[52] U.S. Cl. ..................................... 367/135; 367/98; 367/900
[58] Field of Search ................. 367/87, 103, 124, 131, 367/135, 900, 98

[56] References Cited

U.S. PATENT DOCUMENTS 3,763,490  10/1973  Hadley et al. ................ 343/100 SA
4,316,270  2/1982  van't Hullenaar ..................... 367/98

Primary Examiner—Ian J. Lobo

[57] ABSTRACT

Individual elements of a sonar receiver transducer provide output signals in response to the receipt of acoustic energy and signals are processed to form one or more receiver beams for display. Each element output is provided to a preamplifier to which is applied a time varied gain function. The output signal of at least one of the preamplifiers is additionally provided to an adaptive time varied gain circuit which generates an error signal for correction of the time varied gain function applied to the preamplifiers.

5 Claims, 3 Drawing Sheets

SONAR RECEIVER WITH IMPROVED TIME VARIED GAIN CORRECTION

BACKGROUND OF THE INVENTION

1. Field of the Invention

The invention in general relates to the field of sonar signal processing, and more particularly to the time varying processing of the sonar signals.

2. Background Information

In a sonar system, acoustic pulses are transmitted through the water column toward a target area and acoustic returns from the target area are picked up by a receiver transducer and processed for display.

In one type of sonar system which can form one or more receiver beams, the receiver transducer is comprised of a plurality of individual elements each of which generates an output signal in response to the received acoustic returns. The output signals are provided to individual preamplifiers, corresponding output signals of which, are processed, either by analog circuitry or digital circuitry to form one or more beam signals for display.

Return signals may vary due to unknowns such as temperature, salinity and clarity of the water column. Further, if bottom returns are involved, such as in side looking sonar systems, different bottom types such as mud, sand or rock will return different signals. The preamplifiers and other signal processing circuitry therefore must have enough bandwidth to accommodate for the variations.

To accommodate for attenuation through the water column and for expected returns, a time varied gain circuit is generally provided to vary the gain of the preamplifiers as a function of time after an acoustic transmission. The varied gain function is predetermined and fixed. In addition, in order to decrease the dynamic range of a beam signal for display purposes, and to account for unknowns, there is generally provided an adaptive time varied gain circuit which modifies the beam signal based upon a history of the signal level present in previous returns. That is, gain function is not fixed but is adaptive to present conditions.

Although the beam signal dynamic range is decreased for display, the front end circuitry for amplifying and signal processing still requires a wide dynamic range due to potential error in the fixed time varied gain curve.

The present invention provides for an improved time varied gain correction which can accommodate for unknowns in the water column and various bottom types.

SUMMARY OF THE INVENTION

Sonar signal processing apparatus in accordance with the present invention includes a receiver transducer having a plurality of elements each operable to provide an output signal in response to reflected acoustic energy from a target area, sonified by an acoustic transmission. Each of the elements is connected to a preamplifier, the gain of which is adjusted by a time varied gain circuit. Circuit means are provided to generate at least one beam signal for display purposes. Normalizing processor circuit means are provided and is adapted to receive the output signal of at least one of the preamplifiers occurring over multiple transmissions and is operable to generate an average error signal as a function of time. This error signal is applied to modify the output of the time varied gain circuit. The normalizing processor circuit means may be an adaptive time varied gain circuit to which the beam signal is also applied prior to display.

In one embodiment, a switching device may be provided for receiving a beam signal as well as a preamplifier output signal. A control means is operable to provide the preamplifier output, resulting from each of a predetermined number of transmissions, to the adaptive time varied gain circuit so as to generate an error signal for modification of the front end time varied gain circuit, and to thereafter pass the beam signal to the adaptive time varied gain circuit for display.

DESCRIPTION OF THE PREFERRED EMBODIMENTS

Figure 1:
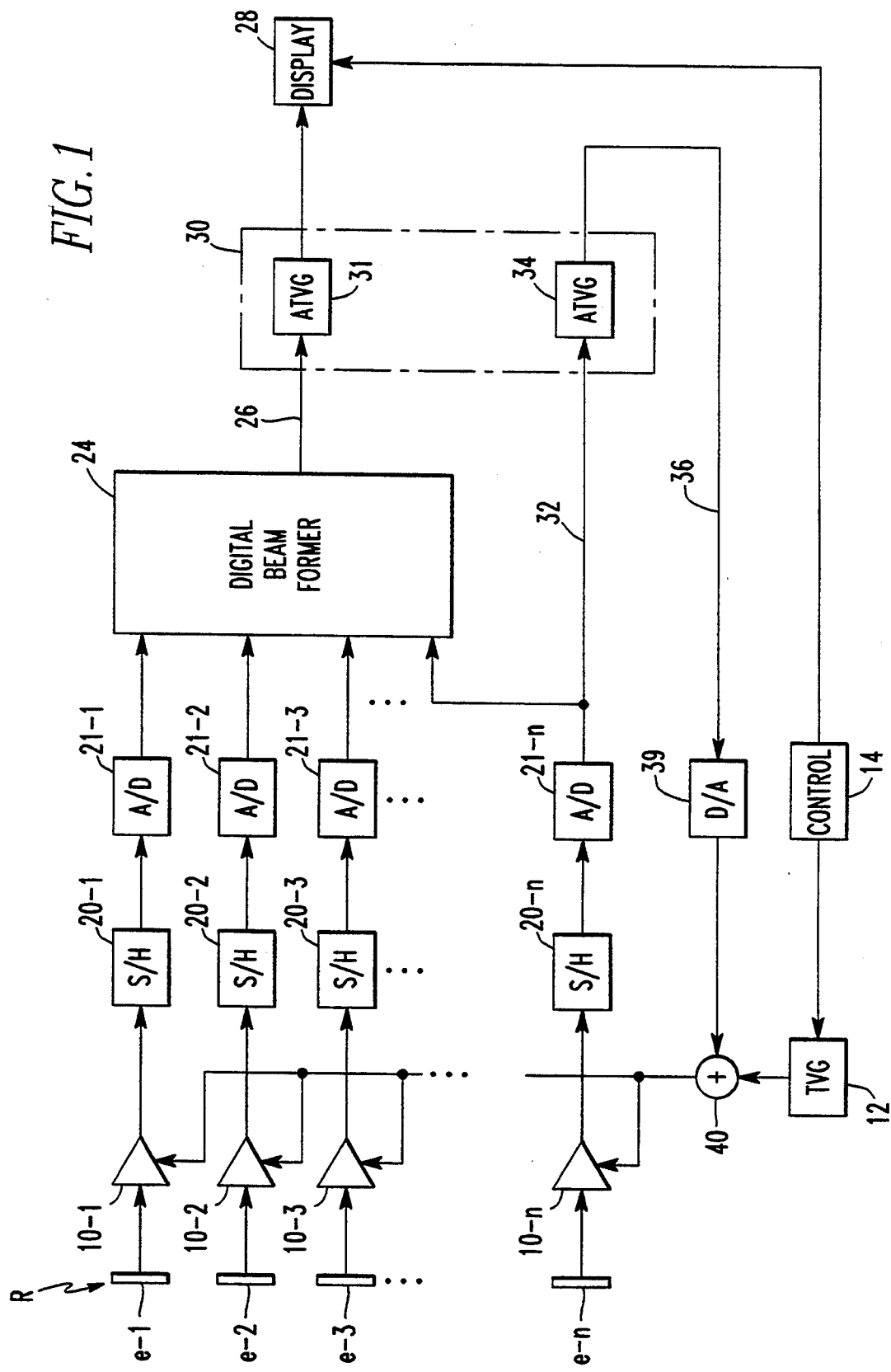
FIG. 1 is a block diagram of sonar receiver apparatus in accordance with one embodiment of the invention.

FIG. 1 illustrates the basics of a sonar receiver which includes a receiver transducer R having a plurality of elements e-1 to e-n arranged in an array and operable to provide respective output signals in response to reflected acoustic energy from a target area previously sonified by an acoustic transmission generated by a transmitter (not shown).

Each element output signal is provided to a respective preamplifier 10-1 to 10-n, the gains of which are individually adjusted as a function of time after a transmission by means of a time varied gain circuit 12 which commences the gain adjustment after each transmission as governed by a central control 14.

The preamplifier output signals are processed to form a beam signal for display purposes and this processing may be accomplished by analog, or as illustrated, by digital circuitry. Accordingly, the processing includes respective sample and hold circuits 20-1 to 20-n with each sampled signal being converted to digital form by means of analog to digital converters 21-1 to 21-n. A digital beam former 24 is provided and is responsive to the outputs of the analog to digital circuits for generating a beam signal on line 26 for presentation on display 28. Prior to presentation, however, it is conventional to reduce the dynamic range of the beam signal by means such as a normalizing processor circuit 30 which is commonly constituted by one or more channels of adaptive time varied gain circuitry 31.

In accordance with the present invention, the output of at least one preamplifier, indicative of an element output signal, in addition to being provided to the digital beam former 24 is also provided to the normalizing processor circuit 30 to generate an average error signal as a function of time to modify the output of time varied gain circuit 12. More particularly, and by way of example, the output of preamplifier 10-n after conversion to digital form is provided on line 32 to adaptive time varied gain channel 34 whose output, on line 36, constitutes an error signal which, after conversion to analog form in digital to analog converter 39, is provided to adder 40. Adder 40 also receives the output of time varied gain circuit 12 such that the output is modified by the error signal prior to application to the preamplifiers.

When the collective outputs of all of the elements e-1 to e-n are processed, a relatively narrow receiver beam is formed. Each element, however, receives acoustic energy from a relatively broad angle. It is this acoustic energy being received by each element that determines the dynamic range needed for that element's signal processing channel. All of the elements receive acoustic energy from the same volume and therefore the error signal based on one element, or an average of a few elements, will be appropriate for all elements.

Figure 2:
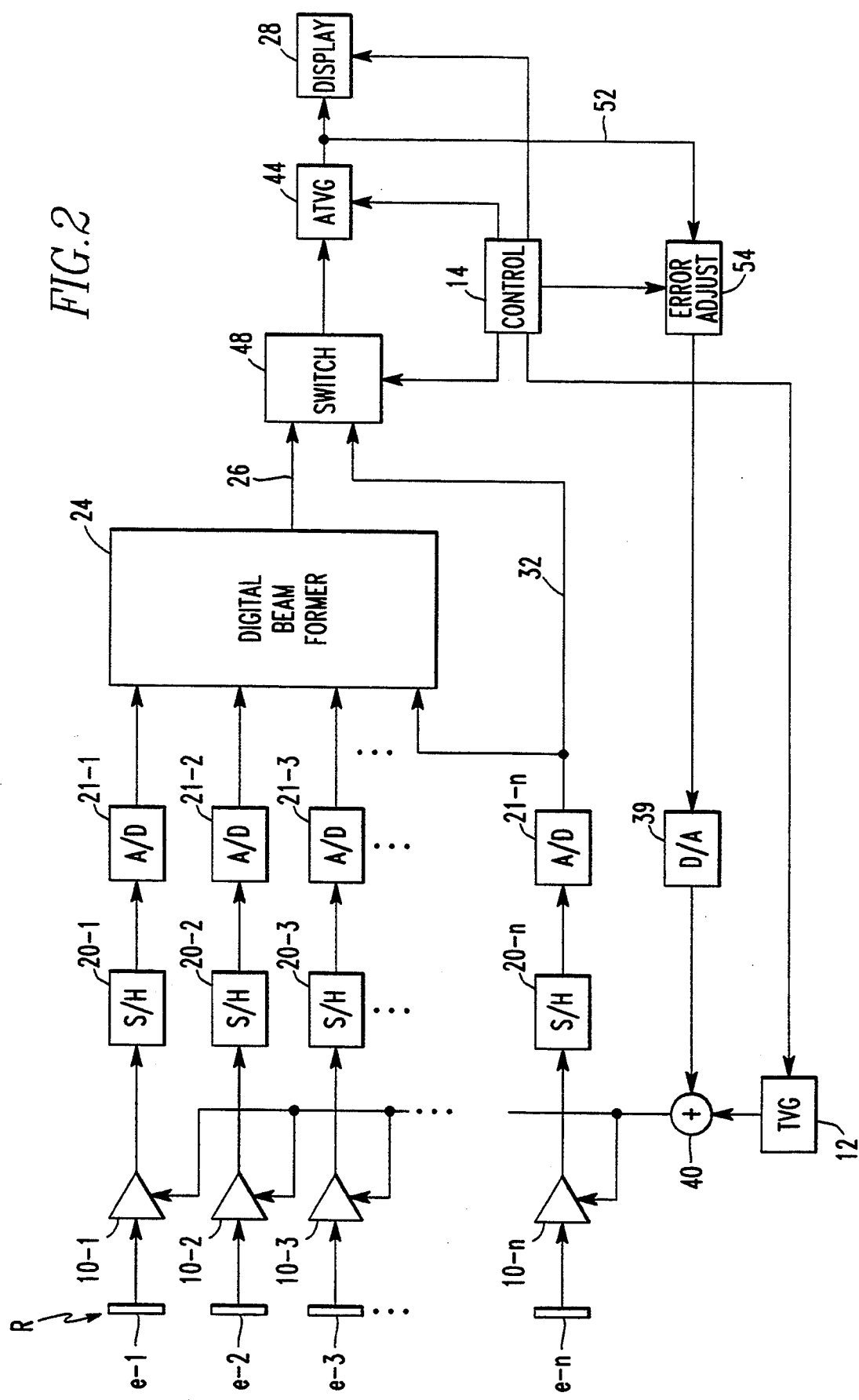
FIG. 2 is a block diagram illustrating another embodiment of the invention.
Figure 3:
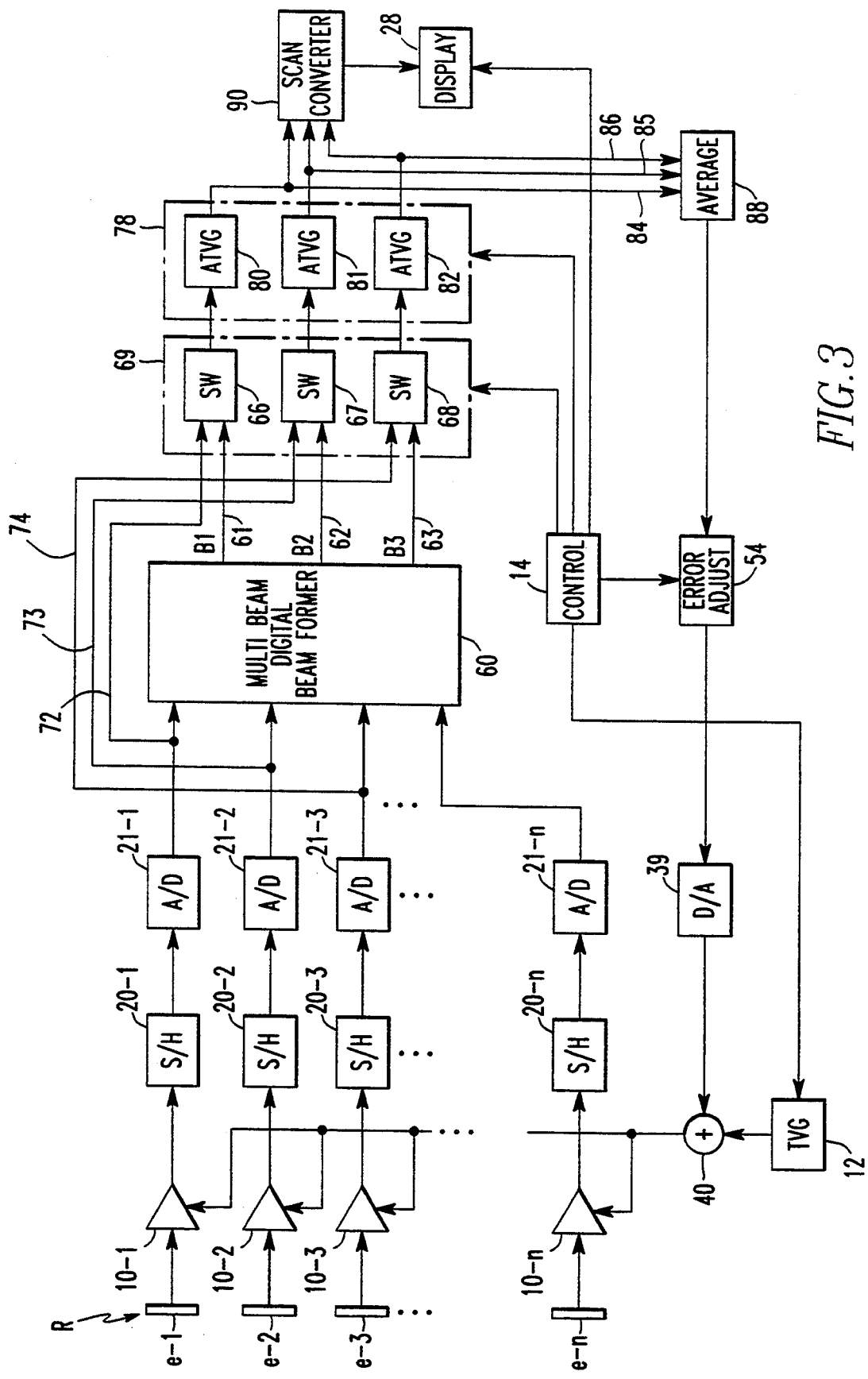
FIG. 3 is a block diagram illustrating operation of the invention with multiple beams.

FIGS. 2 and 3 illustrates other embodiments of the invention and components already described have been given the same reference numerals as in FIG. 1. In the embodiment of FIG. 2, a single adaptive time varied gain circuit 44 is provided for processing either a beam signal or a preamplifier output signal. This mode of operation is accomplished with the inclusion of a switching means 48 which may be an electronic switch which receives as one input, the beam signal on line 26 and as a second input, a preamplifier output signal on line 32. The central control 14 may be utilized to govern operation of the switch 48 to pass the preamplifier output on line 32 to the adaptive time varied gain circuit 44 and to pass subsequent signals on lines 32 resulting from several subsequent transmissions. The adaptive time varied gain circuit 44 is operable to accumulate and average the signals provided to it and when commanded by central control 14, will output on line 52, the resultant signal, constituting an error signal. The error signal is provided to an error adjust circuit 54 which stores it until normal operation proceeds. Normal operation is instituted by central control 14 operating switch 48 to pass the beam signal to the adaptive time varied gain circuit 44, at which point the error adjust circuit 54 is commanded to provide its stored error signal to adder 40 via digital to analog converter 39. The process may then be repeated at a predetermined later point in time or the outputs of the analog-to-digital circuits may be monitored to automatically provide for a new correction, if required.

FIG. 3 illustrates another embodiment of the invention in which multiple beams are formed and wherein the output signals from a plurality of individual preamplifiers are utilized for error correction.

The embodiment of FIG. 3 includes a multi-beam digital beamformer which is operable to receive n input signals from the preamplifiers (suitably processed) to in turn, generate m beam signals, three being illustrated by way of example and designated as beam signal B1 on line 61, B2 on line 62 and B3 on line 63.

The beam signals are provided to one input of respective switches 66, 67 and 68 of a switching arrangement 69 with each switch receiving as its other input preamplifier signals on lines 72, 73 and 74 from three individual preamplifiers 10-1 to 10-3.

A normalizing processor circuit 78 includes three individual adaptive time varied gain channels 80, 81 and 82 and control 14 is operable to govern the switches to pass the preamplifier signals resulting from several transmissions, to the respective adaptive time varied gain channels for computation of individual error signals. After a predetermined number of transmissions, control 14 causes outputting of these error signals on respective lines 84, 85 and 86 to an averaging circuit 88 the output signal of which is provided to the error adjust circuit 54 for modifying the output of time varied gain circuit 12, as in FIG. 2.

After a predetermined number of transmissions, the switches will pass the beam signals to the adaptive time varied gain circuits and the modified beam signals are presented to a scan converter 90 which arranges the signals for presentation on display 28.

I claim:

1. Sonar signal processing apparatus comprising:
   a) a receiver transducer having a plurality of elements each operable to provide an output signal in response to reflected acoustic energy from a target area sonified by an acoustic transmission;
   b) a plurality of preamplifiers connected to respective ones of said elements;
   c) a time varied gain circuit connected to said preamplifiers to adjust the gains thereof as a function of time after a said transmission;
   d) circuit means responsive to the output signals provided by said preamplifiers to generate at least one beam signal;
   e) a display for displaying said beam signal;
   f) an adaptive time varied gain circuit connected to receive said beam signal and operable to adaptively adjust the amplitude thereof for presentation on said display;
   g) switching means connected to receive said beam signal and at least one of the output signals provided by said preamplifiers;
   h) control means operable to control said switching means to apply said at least one preamplifier output signal, resulting from each of a predetermined number of said transmissions, to said adaptive time varied gain circuit to generate an error signal and to apply said error signal to modify the output of said time varied gain circuit;
   i) said control means being thereafter operable to control said switching means to apply said beam signal to said adaptive time varied gain circuit.

2. Apparatus according to claim 1 wherein:
   a) the output signals from a plurality of preamplifiers are applied to said adaptive time varied gain circuit.

3. Apparatus according to claim 1 wherein:
   a) said circuit means is operable to form a plurality of beam signals.

4. Apparatus according to claim 3 wherein:
   a) said circuit means is operable to form a plurality of beam signals; and which includes,
   b) switching means connected to receive a predetermined number of said beam signals and a like number of preamplifier output signals;
   c) said control means being operable to control said switching means to apply said like number of preamplifier output signals resulting from each of a predetermined number of said transmissions, to said adaptive time varied gain circuit to generate a plurality of error signals and being thereafter operable to apply said beam signals to said adaptive time varied gain circuit; and
   d) means for applying said error signals to modify the output of said time varied gain circuit.

5. Apparatus according to claim 4 wherein:
   a) said means for applying is an averaging circuit which is operable to generate an average error signal in response to said error signals provided by said adaptive time varied gain circuit.

* * * * *